United States Patent [19]
Hahn et al.

[11] Patent Number: 5,040,258
[45] Date of Patent: Aug. 20, 1991

[54] DOCK LEVELER WITH AUTOMATIC VEHICLE BARRIER

[75] Inventors: Norbert Hahn, Franklin; Michael A. Swessel, Cudahy, both of Wis.

[73] Assignee: Rite-Hite Corporation, Milwaukee, Wis.

[21] Appl. No.: 528,031

[22] Filed: May 23, 1990

[51] Int. Cl.⁵ ............................................. E01D 01/00
[52] U.S. Cl. ...................................... 14/71.3; 414/537
[58] Field of Search ...................... 14/69.5, 71.1, 71.3, 14/71.7; 414/537; 193/41; 254/89 H

[56] References Cited

U.S. PATENT DOCUMENTS

| | | | |
|---|---|---|---|
| 2,993,219 | 7/1961 | Pennington | 14/71 |
| 3,280,414 | 10/1966 | Layne | 14/71 |
| 3,424,323 | 1/1969 | Barnaby | |
| 3,486,181 | 12/1969 | Hecker et al. | 14/71 |
| 3,533,118 | 10/1970 | Rosengen | |
| 3,786,530 | 1/1974 | LeClear | 14/71 |
| 3,872,948 | 3/1975 | Richards | 14/71 |
| 4,155,468 | 5/1979 | Royce | 414/556 |
| 4,304,518 | 12/1981 | Carder et al. | 414/495 |
| 4,865,507 | 9/1989 | Trickle | 414/537 |
| 4,920,598 | 5/1990 | Hahn | 14/71.1 |

FOREIGN PATENT DOCUMENTS

| | | | |
|---|---|---|---|
| 0935606 | 10/1973 | Canada | 14/71.7 |
| P2634652.1 | 2/1978 | Fed. Rep. of Germany | |
| P2852888.3 | 8/1980 | Fed. Rep. of Germany | |
| 7538541 | 6/1976 | France | |

Primary Examiner—Terry L. Melius
Attorney, Agent, or Firm—Neuman, Williams, Anderson & Olson

[57] ABSTRACT

A dock leveler assembly is provided having an automatic barrier actuated in response to movement of the lip for preventing accidental runoff of material handling vehicles from the loading dock. The assembly includes a ramp for pivotal movement between a stored first position wherein an exposed surface thereof is coplanar with the loading dock platform surface, an upwardly inclined second position, and a declining third position. The lip is operatively connected to a front edge portion of the ramp for movement from a depending position to an outwardly extended cantilevered position. The assembly also includes a barrier unit movable between operative and inoperative modes. When in the operative mode, a segment of the barrier unit automatically projects above the ramp exposed surface and forms a vehicle safety barrier of optimum height.

23 Claims, 6 Drawing Sheets

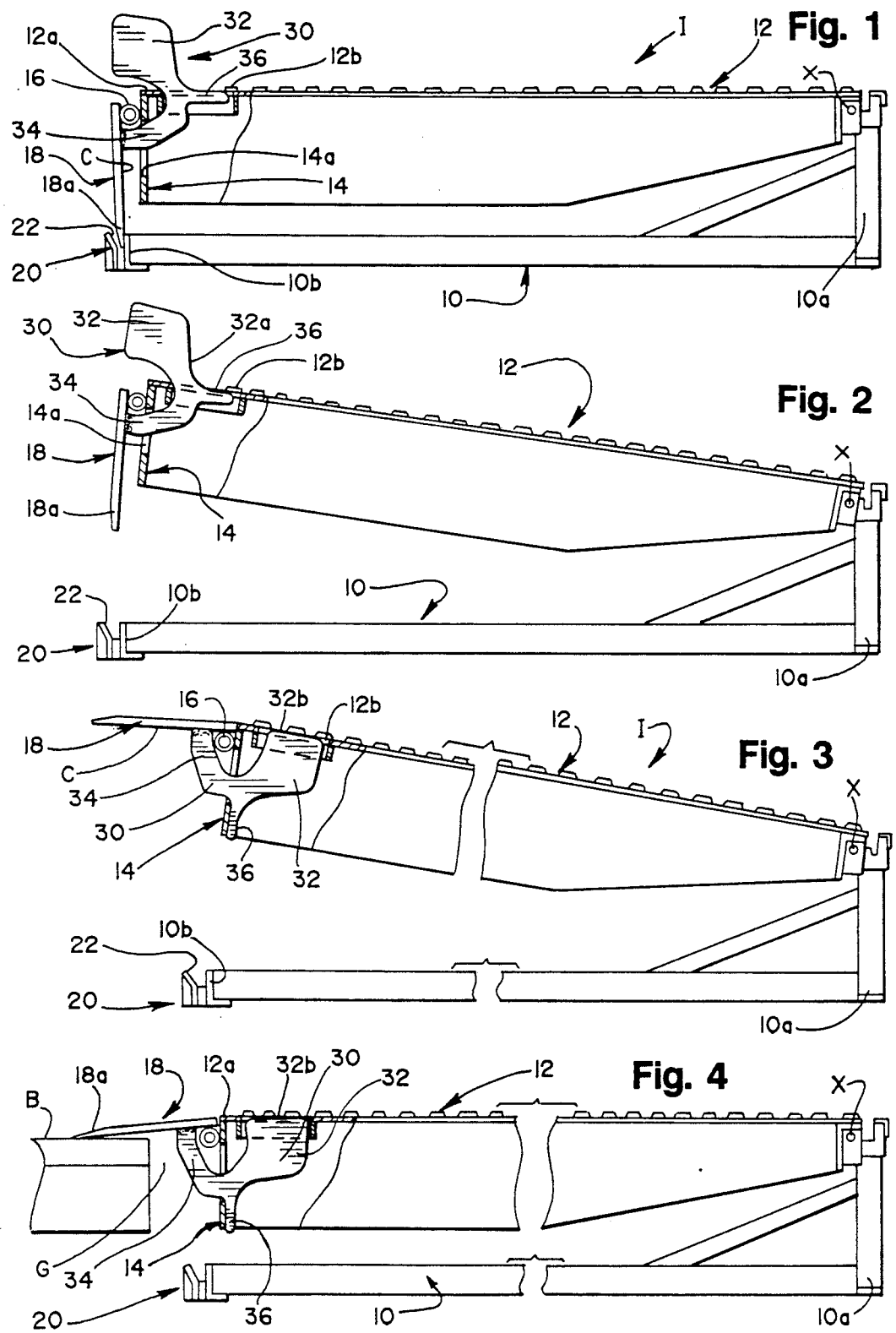

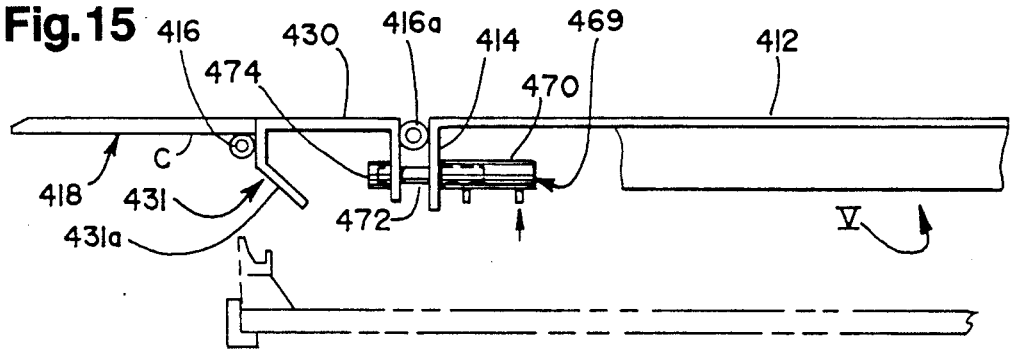
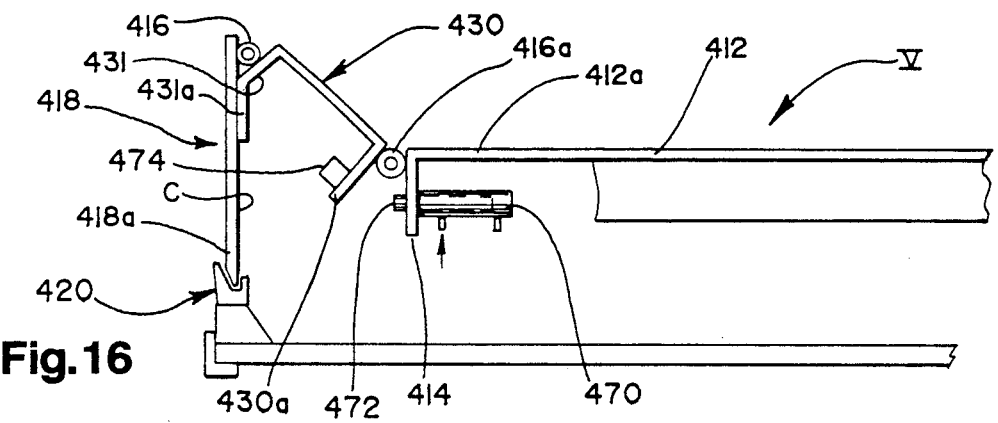
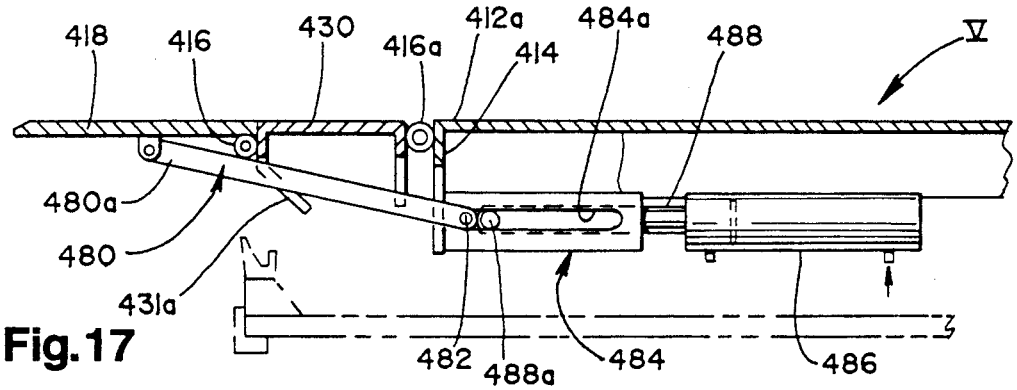
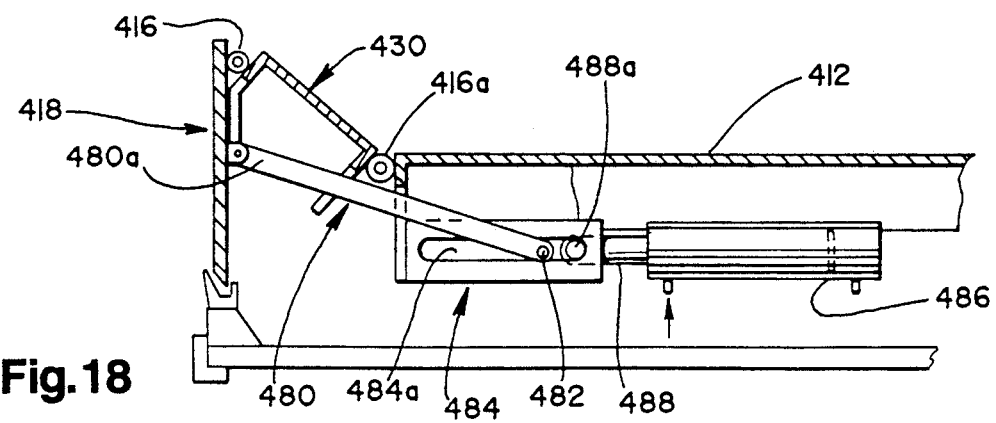

DOCK LEVELER WITH AUTOMATIC VEHICLE BARRIER

BACKGROUND OF THE INVENTION

This invention relates generally to loading dock leveler assemblies and more particularly to a dock leveler assembly which when in one mode automatically provides a barrier to prevent material handling equipment from accidentally running off the exposed front end of the loading dock.

Loading dock levelers, sometimes called dockboards, are used to facilitate the loading and unloading of variously sized vehicles which are parked adjacent to a loading dock that has a working surface above the roadway adapted to adjoin the bed of a parked vehicle. Examples of loading dock leveler assemblies are disclosed in U.S. Pat. Nos. 3,583,014, 3,699,601, 3,728,753, 4,110,860, 4,257,137, 4,531,248, 4,570,277 and 4,744,121. Such dock levelers compensate for height variations between the bed of the parked vehicle and the working, sometimes referred to hereafter as platform surface, surface of the dock since they are typically disposed in a pit or recess at the front of the loading dock and include a ramp pivotal between a raised position above the working surface of the dock and a below dock level position. An extension plate or lip is hinged to the front edge of the ramp and is movable to an extended position to span the gap between the bed of the parked vehicle and the front edge of the ramp. When such dock levelers are not in use, they are stored in a cross-traffic position having an exposed upper surface of the ramp flush with the working surface of the dock and the lip disposed in a depending position.

In the practical implementation of such dock levelers certain safety problems may arise. Loading dock personnel may accidentally drive or push fork lift trucks or related material handling equipment off the exposed front end of the dock leveler when there is no vehicle parked adjacent the loading dock and the dock leveler is stored in the cross-traffic position.

Dock levelers have heretofore been provided to minimize the risk of such accidental run off. Such dock levelers utilize a lip pivotally fixed to the front edge of the ramp wherein the pivot axis of the lip is set outwardly, or forwardly, a substantial distance from the rear edge of the lip. Such a design allows the rear section of the lip between the pivot axis and the lip rear edge to project above the ramp surface and form a barrier when the lip is not in its fully extended cantilevered position. When such a lip is in positions between the stored depending position and the fully extended cantilevered position, the rear section of the lip still forms a barrier by projecting angularly to a varying degree above the ramp surface. Thus, the continued projection of the lip rear section might seriously obstruct loading and unloading operations.

Another type of dock leveler having an automatic vehicle barrier is disclosed in U.S. Pat. No. 4,920,598. The dock leveler assembly disclosed therein relies on a portion of the lip to form a barrier.

There are circumstances where it is desirable to provide an automatic barrier to prevent accidental material handling equipment runoff when the dock leveler assembly is in a stored cross-traffic position and loading and unloading equipment is being utilized. Such circumstances include situations where material must be loaded onto or unloaded from the extreme rear of the bed of the vehicle parked adjacent the loading dock and the placement of the material interferes with the use of the dock leveler with the lip thereof in a fully extended position resting on the rear of the vehicle bed. It is also advantageous to avoid the pinching area developed in levelers which utilize a lip having a barrier forming rear section which overlaps the ramp under certain operating conditions since a potential for entrapping equipment or personnel exists in such levelers.

SUMMARY OF THE INVENTION

Thus, it is a general object of the present invention to provide an improved loading dock leveler which automatically raises a substantial safety barrier or stop to prevent fork lift trucks and related material handling equipment from accidentally running off the front end of the loading ramp when the latter is in a stored position.

It is another object of the present invention to provide an improved loading dock leveler which is readily operable and has maximum safeguards for the safety of loading dock personnel and equipment.

It is a further object of the present invention to provide an improved loading dock leveler which allows loading and unloading operations involving the rear bed portion of a parked vehicle.

Further and additional objects and advantages will appear from the following description, accompanying drawings, and appended claims.

In accordance with one embodiment of the invention, a dock leveler is provided having a ramp hingedly mounted to a frame mountable in a pit formed in a loading dock. The ramp is mounted for movement between a stored first position wherein an exposed upper surface of the ramp is substantially coplanar with the loading dock platform surface, an upwardly inclined second position, and a declining third position. Operatively connected to the front edge portion of the ramp is a lip which is movable between a depending position when the ramp is in the stored first position, and an outwardly extended cantilevered position. The dock leveler includes a barrier means movable between an operative mode and an inoperative mode in response to movement of the lip to and from the lip depending position. In the operative mode, a predetermined first surface segment of the barrier means projects above the upper surface of the ramp and forms a vehicle safety barrier of optimum height when the lip is in the depending position and the ramp is in the stored first position. In the inoperative mode, the predetermined first surface segment of the barrier means does not project above the ramp surface when the lip is in an outwardly extended cantilevered position. The barrier means may be movable to a second operative mode to project a substantial portion of the predetermined first surface segment above the ramp upper surface when the ramp is in a declining third position and the lip is in an intermediate depending position between the stored depending position and the outwardly extending cantilevered position.

DETAILED DESCRIPTION OF THE DRAWINGS AND PREFERRED EMBODIMENTS

For a more complete understanding of the present invention reference should now be made to the accompanying drawings wherein:

FIG. 1 is a side elevational view in partial cross section of one embodiment of the improved dock leveler showing the ramp thereof in the stored first position, the lip in the depending position, and the barrier means in an operative mode.

FIG. 2 is similar to FIG. 1 but showing the ramp in a raised second position and the lip in a depending position.

FIG. 3 is similar to FIG. 2 but showing the lip in the extended cantilevered position, and the barrier means in an inoperative mode.

FIG. 4 is similar to FIG. 3 but shows the lip in the extended cantilevered position resting on the rear portion of a vehicle bed and the barrier means in an inoperative mode.

FIG. 15 is a fragmentary, side elevational view of a fifth embodiment of the improved dock leveler showing the lip thereof in an extended cantilevered position, a barrier means in an inoperative mode, and a locking hydraulic cylinder activated to retain the barrier means in the inoperative mode.

FIG. 16 is similar to FIG. 15 but showing the lip in a depending stored position, the barrier means in an operative mode, and the locking hydraulic cylinder deactivated to release the barrier means so as to assume an operative mode.

FIG. 17 is a vertical sectional view of the embodiment of FIG. 15, but showing a hydraulic cylinder and linkage mechanism activated to pivotally extend the lip to the extended cantilevered position and the barrier means in the inoperative mode.

FIG. 18 is similar to FIG. 17 but showing a hydraulic cylinder and linkage mechanism deactivated and the lip in the stored depending position and the barrier means in the operative mode.

Figure 5:
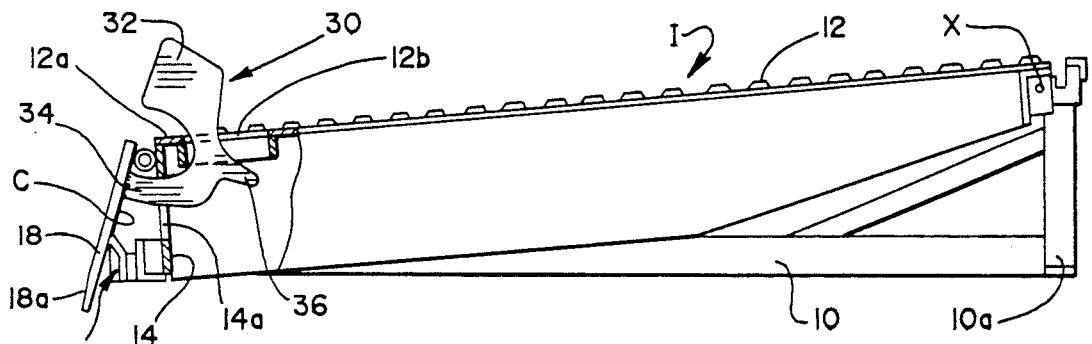
FIG. 5 is similar to FIG. 1 but shows the lip in an intermediate depending position, the ramp in the declining third position, and the barrier means in a second operative mode.
Figure 6:
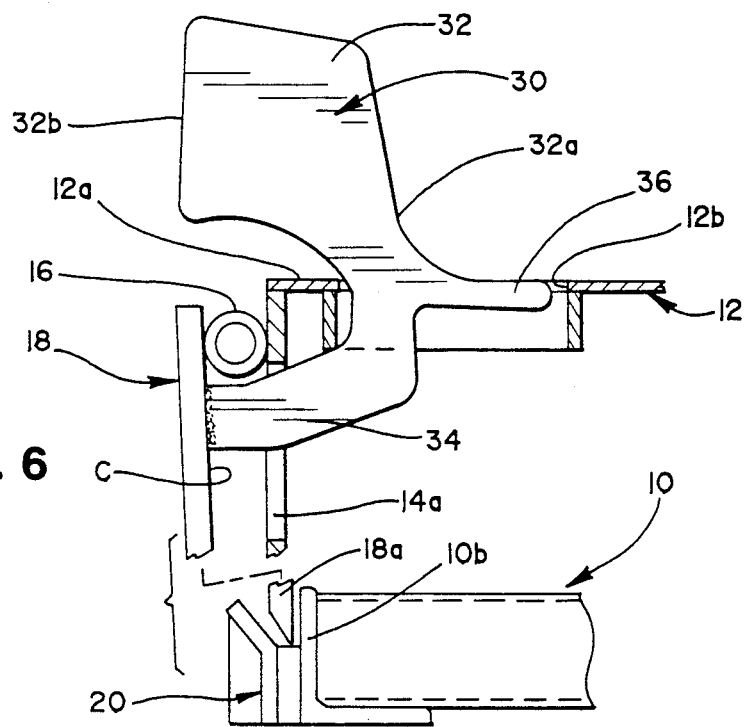
FIG. 6 is an enlarged fragmentary sectional view of the lip of FIG. 1 in the depending position and the barrier means thereof in the operative mode.
Figure 7:
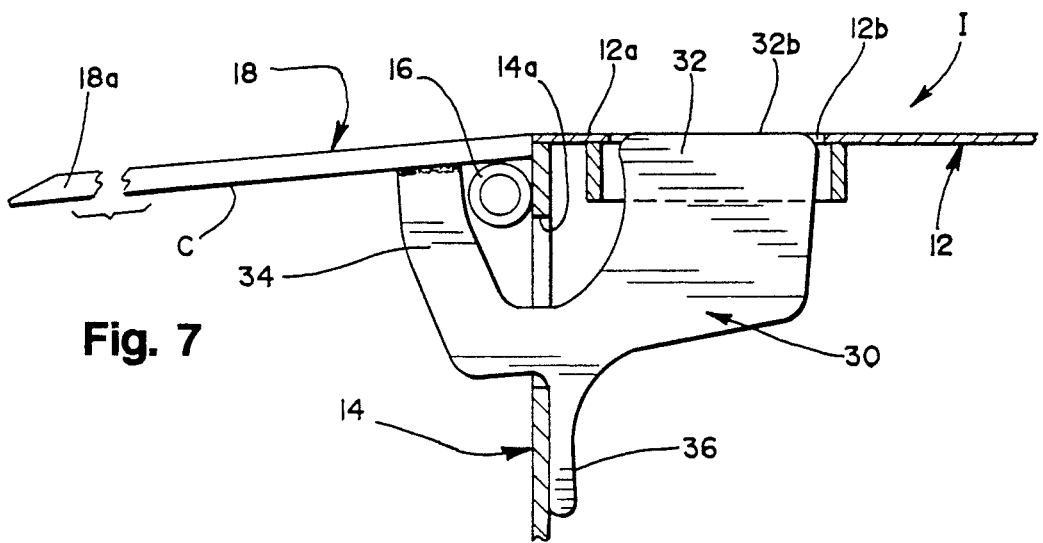
FIG. 7 is similar to FIG. 6 but shows the lip in the extended cantilevered position and the barrier means in the inoperative mode.

Turning now to the drawings and more particularly to FIG. 1, one embodiment of the improved dock leveler assembly I is shown in a stored, or cross-traffic, position. The assembly includes a supporting frame 10 mountable within a pit, not shown, of conventional design formed in a loading dock and having an open front side at the upright front wall of the dock and an open top side at the horizontal platform surface of the dock. The frame 10 includes an upright rear section 10a positioned adjacent the pit rear wall. The rear edge portion of a substantially planar loading ramp 12 is hingedly connected at X to the upper end of the frame rear section 10a. The ramp 12 is sized to conform to the configuration of the pit open top side so that when the leveler is in the stored cross-traffic position, the ramp overlies and closes the open top side thereby allowing personnel and material handling equipment to move across the exposed surface of the ramp which is substantially coplanar with the dock platform surface. The ramp 12 includes a reinforcing header section 14 mounted on and depending from the front edge 12a of the ramp 12. A row of axially spaced hinge tubes 16 is affixed to the front surface of the header section 14 to provide a conventional mechanism for hingedly connecting an extension plate or lip 18 to the front edge portion 12a of the ramp. The width of the lip 18 is substantially equal to the width of the loading ramp 12. When the ramp is in the stored first position, the lip assumes a depending substantially vertical position.

A pair of laterally spaced keeper brackets 20 are disposed outwardly from the front of the frame 10 along a cross support 10b disposed adjacent the open front side of the pit. The brackets 20 supportingly engage the lip lower edge 18a when the lip is in the depending position and the ramp is in the stored first position, as shown in FIG. 1. Each bracket 20 is provided with an upwardly facing notch or pocket 22 sized to accommodate the elongate edge 18a of the lip.

When the dock leveler assembly is actuated, the ramp 12 is pivoted to an initial predetermined upwardly inclined second position, as shown in FIGS. 2 and 3, and then pivoted downwardly to a position which is compatible with the height of the bed of a vehicle B parked at the loading dock, as shown in FIG. 4. When the ramp 12 is raised, the lip or plate 18 is also pivoted from the depending position to an outwardly extending cantilevered position, as shown in FIGS. 3 and 4, to bridge the gap G between the vehicle bed B and the front edge of the ramp 12. It will be apparent that the dock leveler assembly can accommodate the loading and unloading of a variety of vehicles since the ramp is movable between a raised upwardly inclined, above dock level, second position (FIGS. 2 and 3) and lowered declining, below dock level, third position (FIG. 5). The various mechanisms, including hydraulic cylinder and piston devices for affecting pivotal movement of the loading ramp 12 and the lip 18 are well known to those skilled in the art and thus, a description thereof is omitted.

The improved dock leveler assembly I includes a plurality of laterally spaced barrier members 30 adjustably mounted on the front portion of the ramp 12 and aligned in substantially parallel relation to the rear hinge axis X of the ramp 12. The laterally spaced members 30 form a barrier moveable between an operative mode and an inoperative mode in response to movement of the lip 18, as will be described more fully hereinafter. Each member 30 is located in close proximity to the front edge 12a of the ramp. Each member 30 includes an end portion 32 with a predetermined first surface segment 32a which is adapted to project upwardly above the exposed surface of the ramp through an aligned opening 12b disposed proximate the front edge 12a of the ramp when the ramp is in the stored first position. Each member 30 also includes a second end segment 34 which extends through a corresponding opening 14a formed in the ramp header section 14 and is affixed by welding or the like, to the under surface C of the lip plate 18. The number of ramp openings 12b and the number of header section openings 14a correspond to the number of laterally spaced members 30. The improved dock leveler assembly, sized to conform to conventional loading dock pits, may include six members 30 spaced across the width of the assembly. Each, or at least one, member 30 includes a foot extension 36 which abuts the lower end of the ramp header section 14 when the lip 18 is in the outwardly extended cantilevered position, see FIG. 3. The foot extension 36 forms a closure for the loading ramp opening 12b when the ramp is in the stored cross-traffic first position thereby preventing equipment or debris from fouling or being trapped in the ramp openings.

In accordance with the present invention, the barrier means functions between various modes to enhance the safety of loading and unloading operations. As illustrated in FIG. 1, the upwardly projecting end portions 32 of the barrier members 30 while in a first operative mode, prevent handling equipment from accidentally running off the ramp 12. When the ramp is in the stored cross-traffic first position the upwardly projecting first end portion 32 of each member is at optimum height whereby the wheels or lower bumpers of the material handling equipment (e.g., fork lift trucks, carts, and the like) are blocked thereby avoiding the hazard of the equipment being inadvertently pushed or driven off the front edge of the loading ramp. The first end portion 32 of each member, when in the operative mode, has the curved rearwardly facing surface 32a which may be impacted by the material handling equipment located between the ramp front edge 12a and the ramp hinge axis X as seen in FIGS. 1 and 2.

When a truck or trailer is backed in and parked adjacent the loading dock to be loaded or unloaded, the dock leveler assembly is actuated by well known mechanisms to pivotally raise the loading ramp 12 to a predetermined upwardly inclined second position, as shown in FIG. 2. Raising of the ramp 12 to such a position frees the elongate edge 18a of the lip 18 from the keeper brackets 20 and allows the lip 18 to be pivoted by a conventional mechanism to an outwardly extended cantilevered position as shown in FIG. 3. Movement of the lip 18 from the depending position to the cantilevered position automatically lowers the barrier members to an inoperative mode wherein no portion of a spaced member 30 projects above the exposed surface of the ramp 12, as shown in FIG. 3. Once the barrier members are in an inoperative mode and the lip 18 is in the cantilevered position, the ramp 12 is then pivoted downwardly until the edge 18a of the lip rests upon the bed B of the parked vehicle, as illustrated in FIG. 4. The parked vehicle may then be loaded or unloaded safely. It should be noted that, in the inoperative mode, a top exterior surface 32b of end portion 32 of each laterally spaced member 30 is positioned in a coplanar relationship with the exposed surface of the ramp 12 and forms a closure for the aligned ramp opening 12b. The closure provided by the top surface 32b prevents equipment or debris from fouling or being entrapped in the ramp opening 12b during loading and unloading operations.

After loading or unloading operations are complete, the assembly may be returned to the stored cross-traffic first position by simply reversing the sequence described above. Thus, the ramp 12 with the lip 18 in the extended cantilevered position is raised to a predetermined upwardly inclined second position, as shown in FIG. 3. Next, the lip 18 is pivoted to the depending position, as shown in FIG. 2, thereby automatically causing the end portion 32 of each laterally spaced member 30 to project through the corresponding ramp opening 12b and above the exposed surface of the ramp 12. The ramp 12 is then pivoted downwardly until the lip edge 18a engages the keeper brackets 20 thereby supporting the assembly in the stored first position.

Referring to FIG. 5, it will be noted that the improved dock leveler assembly allows loading and unloading of the extreme rear portion of a vehicle bed under circumstances where placement of a load on the bed rear portion or removal of a load therefrom would interfere with the use of the assembly when the lip is in a fully extended cantilevered position. For this type of loading and unloading operation, the dock leveler assembly is raised to the upwardly inclined second position, as shown in FIG. 2, so that the lip 18 will clear the keeper brackets 20. The lip 18 is then pivoted outwardly to an intermediate depending position in order to allow the lip 18 to slide past the keeper brackets 20 when the ramp 12 is lowered to a predetermined declining third position, as shown in FIG. 5. Such a maneuver is commonly performed with existing dock levelers. Since the lip 18 is in an intermediate depending position, rather than the fully extended cantilevered position, a substantial portion of the end portion 32 of each laterally spaced member 30 will project through the ramp opening 12b and extend above the exposed surface of the ramp whereby the barrier is in a second operative mode. However, the spacing between members 30 is sufficiently wide to allow the tines of a fork-lift truck to pass between adjacent members 30 and thus perform loading or unloading operations at the rear of the vehicle bed; yet the spacing is sufficiently narrow to present a barrier or stop preventing passage therepast of the entire fork-lift truck. It will be seen that the improved assembly enhances safety since the upwardly projecting members 30 even when disposed in the second operative mode will still prevent accidental material handling equipment run off if loading dock personnel fail to return the assembly to the full stored cross-traffic position after the vehicle has been driven away from the dock. Any operator backing a fork-lift truck on the unstored declining ramp will encounter the barrier members if the truck is inadvertently backed too far towards the front edge of the ramp.

Figure 8:
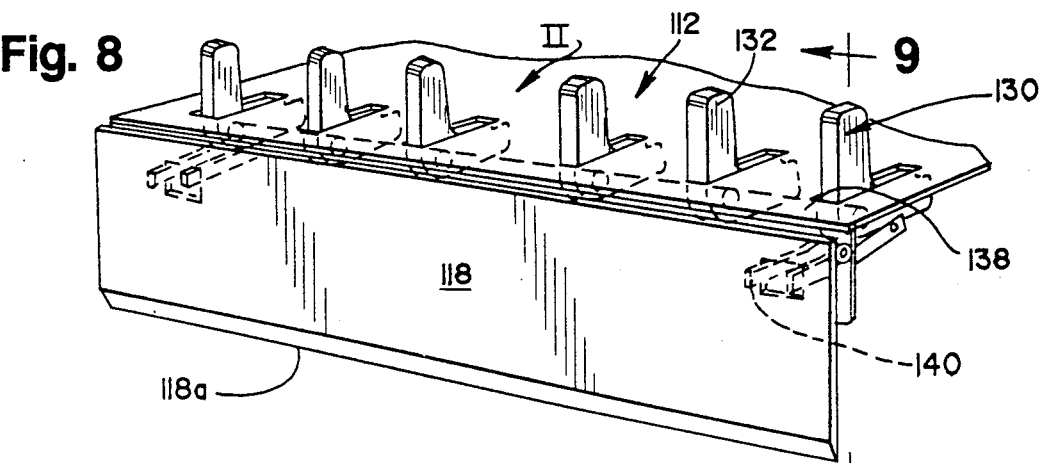
FIG. 8 is an enlarged fragmentary perspective view showing a second embodiment of the improved dock leveler, with the lip in a depending stored position and a barrier means in an operative mode.
Figure 9:
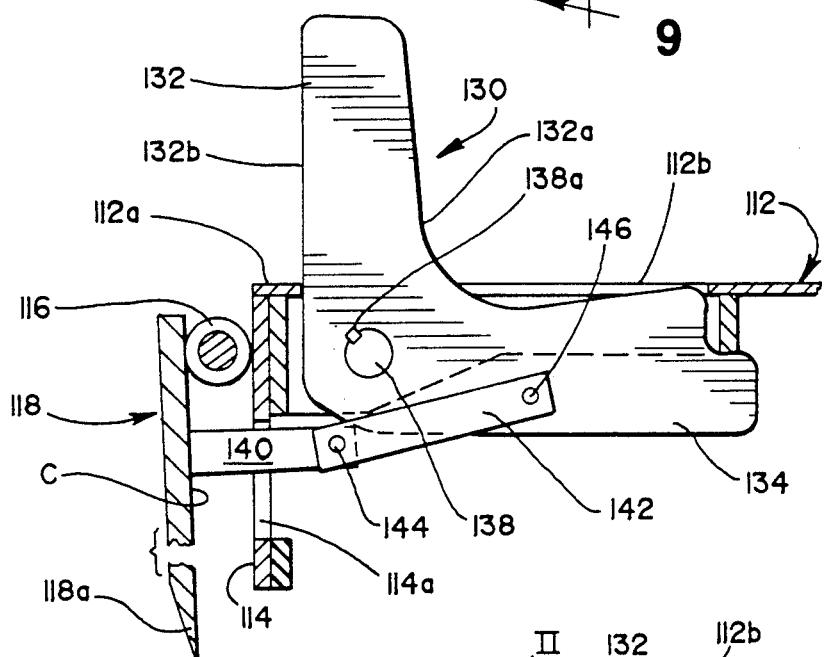
FIG. 9 is an enlarged fragmentary vertical sectional view taken along line 9—9 of FIG. 8 and showing the lip in the depending position, the barrier means in the operative mode, and a linkage means operatively connecting the barrier means to the lip.
Figure 10:
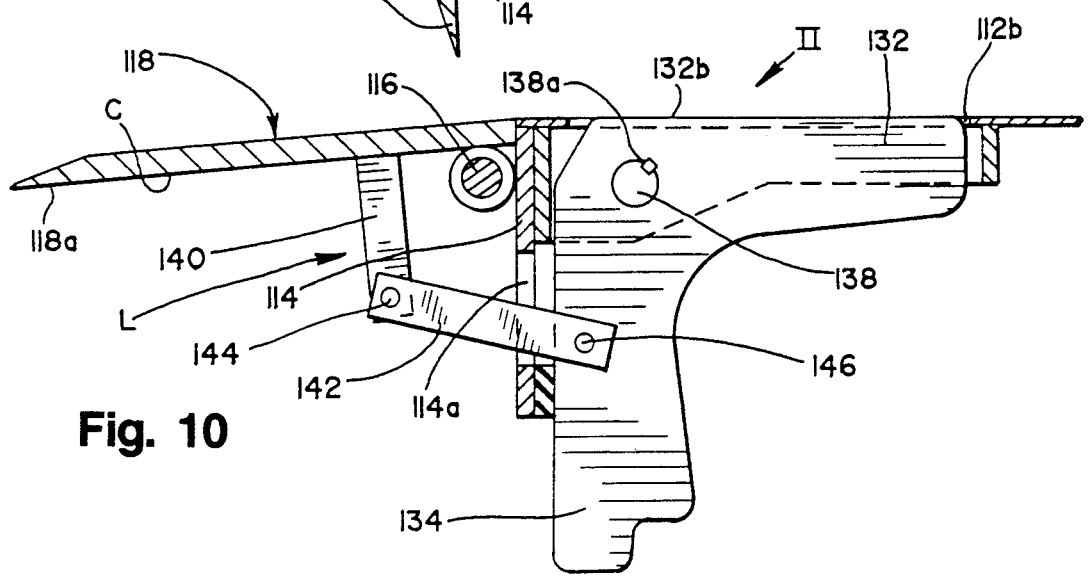
FIG. 10 is similar to FIG. 9 but shows the barrier means in the inoperative mode.

A second embodiment of the improved dock leveler assembly II is illustrated in FIGS. 8-10. The assembly includes a plurality (e.g. six) of generally L-shaped members 130 spaced laterally across the width of the front portion of the ramp 112 and mounted to pivot about a common axis. The pivotal axis is substantially parallel to the hinge axis of the ramp. The L-shaped members 130 are preferably arranged in two sets with one set being disposed on each side of the longitudinal centerline of the ramp 112. Each set may consist of three members 130 which are interconnected by a rod 138 passing through the central region of each member 130. A locking pin or key 138a is fitted in a keyway formed in part in each member 130 and the rod 138 thereby effecting uniform rotational movement of the members of a set about the rod axis. The rod 138 of each set is journalled within bores formed in brackets, not shown, affixed to the underside of the ramp. When the assembly is stored in the cross-traffic position, a first leg or segment 132 of each member projects upwardly to the optimum height above the exposed ramp surface through an aligned opening 112b which is proximate to but recessed from the front edge of the ramp, as shown in FIGS. 8 and 9.

In assembly II a linkage means L is provided to operatively connect the lip 118 to the sets of barrier members so as to automatically move the latter between operative and inoperative modes in response to movement of the lip 118. An elongate transversely extending bracket 140 is fixedly mounted on the concealed surface C of the lip 118 and, when the lip 118 is in the stored mode, see FIG. 9, extends through an opening 114a formed in a depending reinforcing header 114 located at the outer, or front, edge of the ramp. One end of a link piece 142 is pivotally connected to the distal end of bracket 140 by a pin 144 and a second, or opposite, end of the link piece 142 is pivotally connected by pin 146 to a second leg 134 of the aligned generally L-shaped member 130. As a consequence of the operative connection between the lip 118 and one member of each set, movement of the lip 118 to the depending position will simultaneously raise the first leg 132 of each member 130 of the set to a first operative mode whereby a predetermined first surface segment 132a thereof, see FIG. 9, effects a vehicle safety barrier of optimum height, as shown in FIGS. 8 and 9. On the other hand, movement of the lip 118 to the extended cantilevered position will simultaneously lower the first leg 132 of each member of the set to an inoperative mode wherein no portion of any of the members will project above the surface of the ramp, as shown in FIG. 10. In the illustrated embodiment II there is preferably a bracket 140 and link piece 142 for each set of barrier members.

The barrier members may assume a second operative mode wherein a substantial portion of the first surface segment 132a of each member 130 projects above the ramp surface forming a vehicle barrier, when the lip 118 is moved to an intermediate depending position, such as previously described with regard to FIG. 5. Thus, loading and unloading operations involving the extreme rear portion of a vehicle bed may be readily performed with assembly II.

It is to be noted that assembly II requires only two openings in the ramp header section 114. The brackets and associated link pieces are preferably mounted proximate the side edge portions of the lip and ramp as shown in FIG. 8.

As in the case of the first assembly I, a surface 132b of each member first leg 132 is sized to provide a closure for the ramp openings 112b when the lip is in the extended cantilevered position, see FIG. 10. The first legs 132 also include the surface segments 132a which are substantially curved for engagement by the loading and unloading equipment as heretofore described.

Since it may be desirable to replace individual L-shaped members 130 from time to time, an alternate manner of interconnecting each set of members is provided wherein, instead of the single rod 138 for each set, each member 130 in a set may be provided with a short shaft passing through the central region of the member, and each pair of adjoining shafts may be accommodated by a short tube disposed between a pair of members. Suitable locking keys fitted in keyways formed between each member, tube, and shaft can be used to effect uniform rotational movement.

Figure 11:
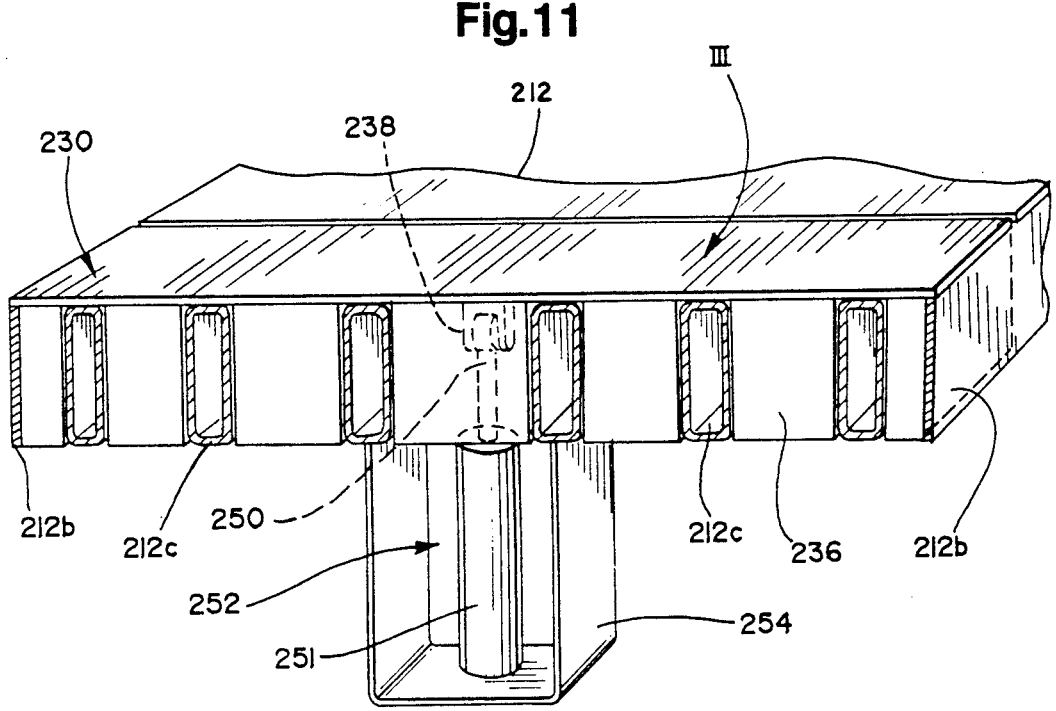
FIG. 11 is a fragmentary perspective, sectional view of a third embodiment of the improved dock leveler showing a barrier means in the inoperative mode and an actuator means for raising and lowering the barrier means.
Figure 12:
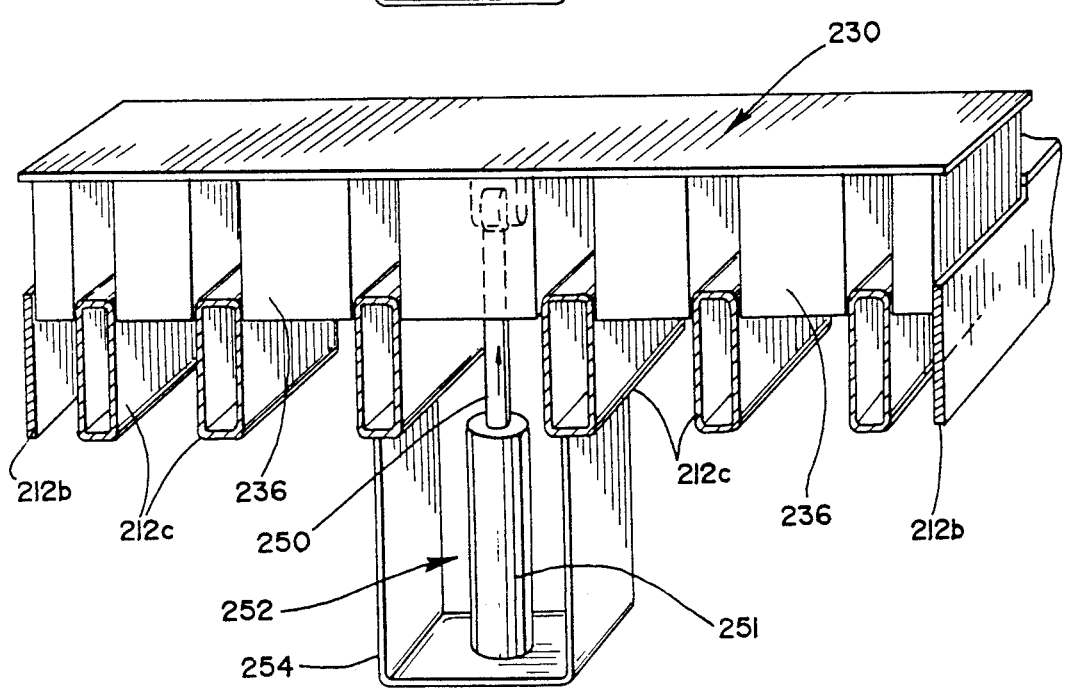
FIG. 12 is similar to FIG. 11 but showing the barrier means in an operative mode.

FIGS. 11 and 12 illustrate a third embodiment of the improved dock leveler assembly III wherein a plate section 230 is provided which is disposed proximate the front edge of the ramp and spans the entire width thereof. In an inoperative mode, or unraised position, plate section 230 is supported in coplanar relationship with the exposed ramp surface by depending side guards 212b and reinforcing channels 212c arranged in parallel relation and affixed to the underside of the ramp and projecting outwardly from the rear edge of the ramp. The plate section 230 has affixed to the underside thereof a plurality of depending laterally spaced reinforcing extensions 236 arranged so as to interfit between the reinforcing channels 212c. A fixed center bracket 238 depends from the underside of plate section 230 and is connected to an exposed upper end of a piston 250 forming a component of a vertically mounted hydraulic cylinder assembly 252. The cylinder 251 of the assembly is supported by a depending U-shaped member 254 affixed to the underside of the two centrally located ramp reinforcing channels 212c, see FIG. 11 or 12. The hydraulic cylinder 251 is connected to a suitable source of hydraulic pressure, not shown, and is adapted to actuate the piston 250 to raise plate section 230 above the ramp surface as shown in FIG. 12, or to retract the piston to lower the plate section to a flush position with respect to the exposed ramp surface 212, as shown in FIG. 11. The activation of the hydraulic cylinder assembly 252 is synchronized with the movement of the lip through a suitable switching control array, not shown, which also controls the mechanism that extends and retracts the lip. Thus, when the lip is moved to the depending position, the switching control array is preset to activate the assembly 252 to raise the plate section 230; and when the lip is moved to the extended cantilevered position, the switching control array is preset to activate the assembly 252 so as to return the plate section 230 to a coplanar relation with the ramp upper surface. The hydraulic cylinder assembly 252 may also be actuated by a limit switch positioned in one of the lip keeper brackets, not shown. The limit switch may be preset to activate the assembly to raise the plate section 230 when the lip assumes a stored position within the keeper brackets and to lower the plate section when the lip is disengaged from the keeper brackets. It will be apparent that the hydraulic cylinder assembly 252 and its associated piston 250 illustrated in the embodiment of FIGS. 11 and 12 may be replaced by suitable electromechanical devices.

Figure 13:
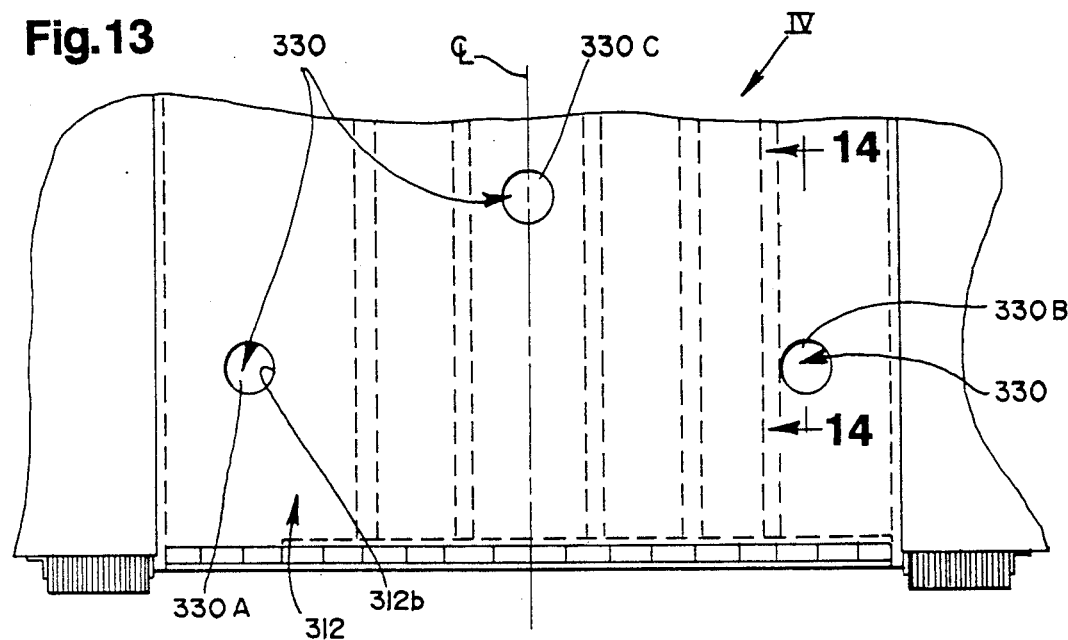
FIG. 13 is a fragmentary top plan view of a fourth embodiment of the improved dock leveler showing the spacing between post-like members comprising a barrier means therefor.
Figure 14:
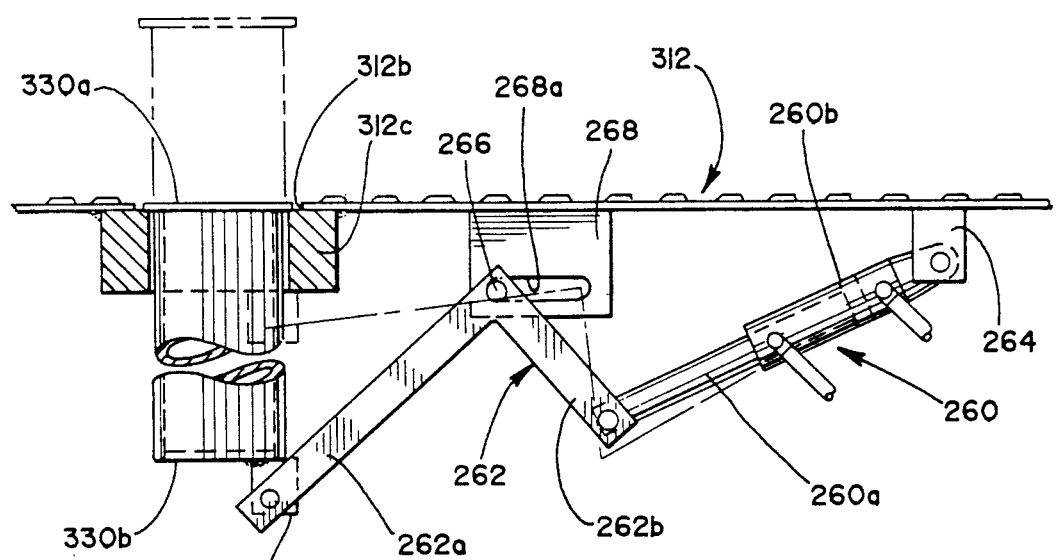
FIG. 14 is an enlarged, fragmentary vertical sectional view taken along line 14—14 of FIG. 13 showing an actuator means for raising and lowering the post-like member of the barrier means.

FIGS. 13 and 14 illustrate a fourth embodiment of an improved dock leveler assembly IV that utilizes a plurality of vertically adjustable post-like members 330 to form a barrier. As shown in FIG. 14, each post-like member 330 is disposed in an aligned opening 312b formed in the ramp 312. The opening may be reinforced by a depending circular guide collar 312c. The top surface 330a of the post-like member forms a closure for the ramp opening when the member is in the inoperative mode. The lower end 330b of each member 330 has a depending finger 332 fixedly secured thereto. Pivotally connected to the finger is one leg 262a of an L-shaped lever 262. A second leg 262b of the lever 262 is pivotally connected to the exposed end of a hydraulically activated piston 260a, the latter forming a component of a hydraulic cylinder assembly 260. The assembly cylinder 260b is pivotally suspended from a bracket 264 affixed to the ramp underside. A lug 266 projects laterally from the lever 262 at the junction of the legs 262a and 262b and is slidably disposed within an elongate slot 268a formed in a depending bracket 268 affixed to the underside of the ramp. The longitudinal axis of the slot is substantially parallel to the exposed upper surface of the ramp and transverse to the direction of movement of each post-like member.

Retraction of the piston 260a into the cylinder 260b causes relative movement of the lug 266 forwardly with respect to the slot 268a and counter-clockwise movement of lever 262 about the lug 266 whereby the upper end 330a of the post-like member is moved from the raised position, shown in phantom lines in FIG. 14, to the inoperative, lowered position. Extension of the hydraulic cylinder piston slides the lug 266 rearwardly in slot 268a causing clockwise movement of lever 262 about the lug and raising the post-like member surface 330a above the ramp exposed surface. As heretofore described, activation of the hydraulic cylinder assembly 260 is synchronized with the movement of the lip between the cantilevered and depending positions by a suitable switching control array, not shown, which also operates the mechanism for pivotally rotating the lip. The hydraulic cylinder assembly 260 may also be actuated by a limit switch positioned in one of the lip keeper brackets as previously described. The raising and lowering of the post-like member 330 may be accomplished by alternative electromechanical or hydraulic devices that directly drive the post-like member 330.

Although a plurality of post-like members 330 may be disposed in a parallel line proximate the front edge of the ramp, FIG. 13 shows an optional spacing of three post-like members wherein two of the members 330A, 330B are positioned adjacent the side edges and the front edge of the ramp and a third member 330C is positioned rearwardly along the longitudinal centerline of the ramp. Thus, the three members form the vertices of an isoceles triangle. The distance, approximately two and one half feet, between the members forming the equal sides of the triangle is limited to a length narrower than the width of conventional material handing equipment. When utilizing the triangular arrangement of the barrier members, the latter may be operated between an inoperative mode and an operative mode only when the lip is in the depending stored position.

The third and fourth embodiments illustrated in FIGS. 11-14 may have the barrier controlled to move between an operative mode and an inoperative mode in an alternate manner. For example, plate section 230 of assembly III may be raised and lowered independently of the movement of the lip. This alternative manner may be accomplished by having a suitable switching control array preset to activate the hydraulic cylinder assembly 252 to lower or raise the plate section 230 in response to signals generated by operation of associated loading dock equipment such as vehicle restraints. The hydraulic cylinder 252 can also be activated by providing a control unit operable by loading dock personnel through suitably coded keys or buttons. The raising and lowering of the post-like members of assembly IV may be controlled in similar alternate manners.

FIGS. 15-18 illustrated a fifth embodiment of the improved dock leveler assembly V. The assembly includes a reinforced plate-like intermediate section 430 having a front, or outer, edge thereof hingedly connected by a first row of axially spaced hinge tubes 416 to the rear edge of a lip 418. The rear edge of the section 430 has a depending flange section 430a which is hingedly connected to a second row of axially spaced hinge tubes 416a mounted on a depending header section 414 affixed to the front edge 412a of the ramp 412. As more fully described hereinafter, this articulated configuration allows the section 430 to form an upright barrier when the assembly is stored in a cross-traffic first position.

In order to maintain intermediate section 430 in a coplanar relation with the exposed upper surface of the ramp during loading and unloading operations and still allow the front section 430 to act as a barrier when the assembly is stored, a releasable locking mechanism 469 is mounted on the header section 414 beneath the hinge connection joining the intermediate section 430 to the ramp 412. The locking mechanism preferably includes a hydraulic cylinder 470 affixed to header section 414 and having the hydraulic input side of the cylinder disposed rearwardly of the header section 414 while the exposed end of the piston 472 is disposed outwardly of the header section and beneath the second row of hinge tubes 416a. The hydraulic piston releasably retains the intermediate section and the ramp in a coplanar relationship by the extension of piston 472 into a retaining socket 474 affixed to the outwardly disposed side of depending flange 430a affixed to the rear edge of intermediate section 430. The socket is aligned with an opening formed in flange 430a.

The assembly V includes a pair of laterally spaced keeper brackets 420 similar to those previously described with respect to assembly I. As illustrated in FIG. 16, the keeper brackets 420 supportingly engage the free edge 418a of the lip 418 when the latter is in the depending position and the ramp is in the stored cross-traffic position. In this position, the articulated coupling of section 430 to both the lip 418 and the ramp front edge 412a allows the section 430 to assume an upwardly inclined barrier-forming first position projecting above the platform surface of the loading ramp to the optimum height.

As the ramp is raised, the lip 418 is disengaged from the keeper brackets 420 allowing the lip to be subsequently pivoted outwardly to its extended cantilevered position after intermediate section 430 has pivoted about the hinge tubes 416a to a coplanar relationship with the ramp platform surface. Once the coplanar relationship has been achieved, the hydraulic piston 472 is activated to extend the piston arm into the retaining socket 474 affixed to the flange 430a. Extension of the piston arm releasably locks the ramp and intermediate section in the coplanar relationship and thus prevents the intermediate section 430 from pivoting upwardly or downwardly relative to the ramp.

After the ramp and intermediate section are locked in coplanar relationship, the lip 418 is then pivoted outwardly to the extended cantilevered position so that the assembly when lowered as a unit will span the gap between the dock and the back end of the parked vehicle thereby enabling the loading and unloading operations to be safely performed.

To pivot the lip 418 to the cantilevered position, the improved assembly V may include a mechanism as shown in FIGS. 17 and 18. The mechanism preferably includes a push link 480 having one end 480a thereof pivotally connected to a bracket affixed to the underside of lip 418. A stud or pin 482 is attached to the other end of the push link 480 and is slidably disposed within an elongate slot 484a formed in a guide plate 484 attached to and extending rearwardly from the header section 414. A hydraulic cylinder 486 is affixed to the underside of the ramp and the exposed end 488a of the hydraulic piston 488 is also slidably disposed within the guide plate slot 484a. The piston end 488a is located within the slot between the push link pin 482 and the cylinder 486. As the piston is moved outwardly from the cylinder the push link pin 482 is pushed outwardly along slot 484a which in turn causes the link to pivotally raise the lip 418 to its extended cantilevered position, see FIG. 17.

With the ramp and intermediate section pivoted as a unit above dock platform surface, the lip 418 may be lowered to a depending position by retracting the piston 488 into the hydraulic cylinder 486 whereupon the end 488a of the piston will slide rearwardly within the slot 484a. The weight of the lip 418 will cause the push link pin 482 to simultaneously slide rearwardly with the piston pin 488a in slot 484a thereby allowing the lip 418 to pivot downwardly about tubes 416 as an axis. Once the lip 418 assumes the depending position, the ramp and intermediate section may be lowered as a unit from the raised or above-dock level position to the cross-traffic stored position wherein the lip 418 engages the keeper brackets 420. When the lip engages the keeper brackets or has been lowered a predetermined distance, the hydraulic cylinder 470, see FIG. 16, is automatically activated to retract piston 472 out of the retaining socket 474 and thus unlock the ramp and intermediate section from the coplanar relationship. Further lowering of the ramp to its stored cross-traffic first position causes the articulated intermediate section 430 to pivot upwardly about tubes 416a as an axis to an upright barrier position, see FIGS. 16 and 18.

It should be noted in FIGS. 15-18 that the outer edge of intermediate section 430 is provided with a depending reinforcing flange 431. The lower edge portion 431a of the flange is angularly offset rearwardly so as to (a) not interfere with the lip 418 pivoting downwardly to its stored position, and (b) be disposed in proximate face to face relation with the concealed surface C of the lip 418 and provide reinforcement for the lip against possible impact from a vehicle while backing towards the loading dock.

Thus, an improved loading dock leveler assembly has been disclosed that automatically raises a substantial barrier in response to the movement of the lip to prevent material handling equipment from accidentally running off the front end of a loading dock.

What is claimed is:

1. A dock leveler for a loading dock having a substantially horizontal platform surface and a substantially vertical front wall, said dock leveler comprising:
a frame having a rear section;
a ramp having a rear edge portion hingedly connected to the frame rear section for movement between a stored substantially horizontal first position whereby a front edge portion of the ramp is adapted to be proximate the dock front wall and an upper surface of the ramp is adapted to be substantially coplanar with the dock platform surface, and a predetermined upwardly inclined second position;
a pivotally mounted lip carried by said ramp and having a pivotal axis in close proximity to the ramp front edge portion, said lip being movable between a stored position and an outwardly cantilevered position when said ramp assumes said second position; and
barrier means movable between operative and inoperative modes, said barrier means being in an operative mode when said ramp is in the first position and said lip is in said stored position; said barrier means, when in said operative mode, providing a predetermined first surface segment located between the ramp front and rear edge portions and projecting above the ramp upper surface and forming an upright safety stop; when said barrier means is in an inoperative mode, said lip is in said outwardly cantilevered position and no portion of said barrier means projects above the ramp upper surface.

2. A dock leveler for a loading dock having a substantially horizontal platform surface, said dock leveler comprising:
a frame having a rear section;
a ramp having a rear edge portion hingedly connected to the frame rear section and a front edge portion, said ramp being movable between a stored first position wherein an exposed surface of the ramp is substantially coplanar with the dock platform surface, and a predetermined upwardly inclined second position;
a lip operatively connected to the front edge portion of the ramp and movable between a depending position maintaining said ramp in said first position, and an outwardly extended cantilevered position when said ramp assumes said second position; and
barrier means movable between an operative mode and an inoperative mode in response to movement of said lip to and from the depending position, said barrier means being in an operative mode when said ramp assumes the stored first position and said lip assumes the depending position, whereby a predetermined first surface segment of said barrier means disposed between the ramp front and rear edge portions projects above the exposed surface of the ramp and forms a safety barrier; when said barrier means is in an inoperative mode the predetermined first surface segment thereof assumes a non-projecting position relative to the ramp exposed surface, said barrier means being in said inoperative mode when said lip is in the outwardly extended cantilevered position.

3. The dock leveler of claim 1 or 2 wherein the barrier means is operatively connected to a concealed surface of said lip; when said barrier means is in said operative mode, the first surface segment thereof extends through an opening formed in said ramp and located between the front and rear edge portions of said ramp.

4. The dock leveler of claim 1 or 2 wherein the barrier means includes a plurality of laterally spaced members, one end portion of each member having said predetermined first surface segment and being disposed within a corresponding opening formed in said ramp and projecting upwardly above the ramp exposed surface when said barrier means is in the operative mode.

5. The dock leveler of claim 1 or 2 wherein the barrier means includes a plurality of laterally spaced members each having a first section including the predetermined first surface segment aligned with a corresponding opening formed in said ramp and projecting upwardly above the ramp exposed surface when said barrier means is in an operative mode; each member having a second section extending angularly from said first section; and means operatively connected to said lip and the second section of at least one member for simultaneously effecting movement of said members to said operative mode.

6. The dock leveler of claims 1 or 2 actuator means for raising said barrier means to an operative mode when said lip is moved to the stored position, and for lowering said barrier means to an inoperative mode when said lip is moved to the outwardly extended cantilevered position.

7. The dock leveler of claim 6 wherein said barrier means comprises a plurality of laterally spaced post-like members, and said actuator means is carried by said ramp and operatively connected to said members effecting simultaneous controlled endwise movement thereof between operative and inoperative modes.

8. The dock leveler of claim 2 or 1 wherein the ramp front edge portion includes an intermediate section having a hingedly connected inner edge and an outer edge to which said lip is hingedly connected for movement between said first and second positions; said barrier means being formed by said intermediate section whereby, when said barrier means is in the operative mode and said lip is in the depending position, said ramp intermediate section extends angularly upwardly from the ramp exposed surface portion forming a safety stop.

9. A dock leveler for mounting within a pit formed in a loading dock, the pit having an open front side at an upright front wall of the loading dock and an open top side at a substantially horizontal platform surface of the dock, said dock leveler comprising:
a frame mountable within the pit and having a rear section thereof positionable adjacent a rear wall of the pit;
a ramp having a rear edge portion hingedly connected to the frame rear section, said ramp being movable between a stored substantially horizontal first position overlying the pit open top side and having an exposed surface of the ramp substantially coplanar with the dock platform surface, a predetermined upwardly inclined second position, and a predetermined declining third position;
a lip operatively connected to a front edge portion of the ramp and movable between a depending position, an outwardly extended cantilevered position, and an intermediate depending position; and
barrier means operatively connected to said lip and activated thereby between a first operative mode, a second operative mode, and an inoperative mode;
said barrier means being in the first operative mode when said ramp assumes the first position and said lip is in the depending position, whereby a first segment of said barrier means is exposed and projects a first predetermined distance above the ramp exposed surface and forms a safety barrier;
said barrier means being in the second operative mode when said ramp assumes the third position and said lip is in the intermediate depending position, whereby only a portion of the first segment of the barrier means is exposed and projects a second predetermined distance above the exposed surface of the ramp and forms a safety barrier;

when said barrier means is in the inoperative mode, no segment thereof projects above the ramp exposed surface, said barrier means being in said inoperative mode when said lip is in said outwardly extended cantilevered position.

10. The dock leveler of claim 9 wherein the barrier means includes a second segment spaced from said first segment and operatively connected to a concealed surface of said lip.

11. The dock leveler of claim 10 wherein the barrier means includes a plurality of members relatively spaced across a front portion of said ramp, one end of each member projecting upwardly through an aligned opening formed in said ramp above the ramp exposed surface when said barrier means is in either the first or second operative mode; at least one member having a second end attached to a concealed surface of said lip.

12. The dock leveler of claim 11 wherein the barrier means includes a substantially planar top surface disposed in substantially coplanar relation with the ramp exposed surface when said barrier means is in an inoperative mode.

13. The dock leveler of claim 11 wherein each member of the barrier means is provided with a foot extension disposed intermediate said first and second segments and effecting closure of the aligned ramp opening when said member is in the first operative mode.

14. The dock leveler of claim 9 wherein the barrier means includes a plurality of laterally spaced members, each having a first section projecting upwardly through an aligned opening formed in said ramp when said barrier means is in either the first or second operative mode, and a second section spaced from said first section; and linkage means for operatively interconnecting said lip and the second section of at least one member.

15. The dock leveler of claim 14 wherein said linkage means includes a bracket affixed to a concealed surface of said lip and a link having one end connected to said bracket and a second end connected to the second section of the said one member.

16. The dock leveler of claim 9 wherein the barrier means is disposed in close proximity to, but spaced from, a front edge portion of the ramp.

17. The dock leveler of claim 9 wherein said frame includes a front section positionable on a bottom wall of the pit and adjacent the pit open front side, said frame front section being provided with outwardly extending retaining means for supportingly engaging said lip when said lip is in the depending position.

18. The dock leveler of claim 9 wherein said barrier means, when in the operative mode, is disposed in spaced substantially parallel relation with the hinge axis of said ramp.

19. The dock leveler of claim 9 wherein the barrier means when in the operative mode includes a substantially curved, rearwardly facing surface.

20. A dock leveler for mounting within a pit formed in a loading dock, the pit having an open front side at an upright front wall of the loading dock and an open top side at a substantially horizontal platform surface of the dock, said dock leveler comprising:
a frame mountable within the pit and having a rear section positionable adjacent a rear wall of the pit;
a ramp having a rear edge portion hingedly connected to the frame rear section, said ramp being moveable between a substantially horizontal first position overlying and substantially closing the pit open top side and having an exposed surface of the ramp substantially coplanar with the dock platform surface, a predetermined upwardly inclined second position, and a predetermined declining third position;

a lip hingedly connected to a front edge portion of the ramp and moveable between a depending supported position for storing said ramp in said first position, an outwardly extended cantilevered position when said ramp is in said second position, and an intermediate depending unsupported position when said ramp is in said third position;

stationary means for retaining said lip in the depending supported position; and barrier means disposed in close proximity to, but spaced from, a front edge portion of the ramp and in substantially parallel relation with the hinge axis of the ramp, said barrier means comprising a plurality of members operatively connected to said lip and activated thereby between a first operative mode, a second operative mode, and an inoperative mode;

said barrier means being in the first operative mode when said ramp assumes the first position whereby a first segment of each member projects upwardly through an aligned opening provided in said ramp and forms a vehicle safety barrier above the ramp exposed surface;

said barrier means being in the second operative mode when said ramp assumes the third position whereby only a portion of the first segment of each member projects upwardly through the aligned opening and forms a vehicle safety barrier;

said barrier means being in said inoperative mode when the lip is in the outwardly extending cantilevered position whereby the first segment of each member is substantially coplanar with the ramp exposed surface and substantially closes the ramp opening.

21. A dock leveler for mounting within a pit formed in a loading dock, the pit having a front side open at a front wall of the dock and a top side open at a substantially horizontal platform surface of the dock, said leveler comprising:

a ramp having a rear edge portion hingedly mountable adjacent a rear wall of the pit whereby said ramp is movable between a stored substantially horizontal first position for overlying the pit open top side and having an exposed surface in substantially coplanar cross-traffic relation with the dock platform surface, and a predetermined upwardly inclined second position;

a lip operatively connected to a front edge portion of said ramp and moveable between a depending position for maintaining said ramp in said first position, and an outwardly extended cantilevered position when said ramp is in the second position;

barrier means mounted proximate the ramp front edge portion for movement between an operative mode wherein a segment of said barrier means projects above the exposed surface of the ramp, when the latter is in the first position, forming a vehicle safety barrier of optimum height, and an inoperative mode wherein the barrier means segment is substantially flush with the ramp exposed surface; said barrier means being responsive to the lip movement; and means for actuating said lip to the outwardly extended cantilevered position, said means including a piston-cylinder assembly mounted on an underside of said ramp and having the assembly piston mounted for controlled relative movement outwardly of the assembly cylinder in a direction towards the ramp front edge portion, a slotted bracket depending from the ramp underside and located between the ramp front edge portion and an end of the assembly cylinder, said assembly piston having a distal end thereof slidably accommodated in a bracket slot, and an elongate push link having a first end connected to a concealed surface of said lip and a second end slidably accommodated in said bracket slot and forwardly of the piston distal end, said link second end being pushed outwardly relative to said bracket slot by said piston distal end upon said piston being actuated outwardly from the assembly cylinder.

22. A dock leveler for a loading dock having a substantially horizontal platform surface, said dock lever comprising:

a frame having a rear section;

a ramp having an exposed surface portion and a rear edge portion hingedly connected to the frame rear section; said ramp being movable between a stored substantially horizontal first position and a predetermined upwardly inclined second position;

a lip operatively connected to said ramp front edge portion and movable between a stored position and an outwardly extending cantilevered position when said ramp assumes said second position;

barrier means movable between an operative mode and an inoperative mode, said barrier means being in an operative mode when said ramp is in the first position and the lip is in the stored position, said barrier means including an articular section hingedly connected to said lip, and adjustable locking means releasably retaining said articular section in a substantially coplanar relation with the exposed surface portion of said ramp when said lip is in said outwardly extending cantilevered position, said articular section projecting above the ramp exposed surface portion and forming a safety barrier when said barrier means is in operative mode.

23. The dock leveler of claim 22 wherein the articular section includes a depending reinforcing flange disposed proximate the lip hinge connection; said flange having a lower edge portion angularly offset rearwardly towards the ramp hinge connection; said offset lower edge portion being disposed in proximate face to face relation with a concealed surface of said lip when the latter is in the depending position.

* * * * *